INVENTORS
LAWRENCE P. HORWITZ
JOSE REINES
GLENMORE L. SHELTON, JR
BY John J. Goodwin
ATTORNEY

United States Patent Office 3,196,212
Patented July 20, 1965

3,196,212
LOCAL AMPLITUDE DETECTOR
Lawrence P. Horwitz, Chappaqua, Jose Reines, Crompond, and Glenmore L. Shelton, Jr., Carmel, N.Y., assignors to International Business Machines Corporation, New York, N.Y., a corporation of New York
Filed Dec. 7, 1961, Ser. No. 157,755
10 Claims. (Cl. 179—1)

The present invention relates to signal indicators and more particularly to devices for providing an indication of the local maximums or local minimums within a varying magnitude signal.

Devices are presently available which will provide an indication of the maximum or minimum variation of a varying magnitude input signal, however, in some instances, it is more desirable to select local maximums and local minimums from a varying magnitude signal. In such instances, it is not only desirable that the circuit be able to indicate the presence of local maximums and local minimums over a period of time but also to eliminate the nearby maximums or minimums in the vicinity of the indications selected.

For example, in the technology of sound identification, such as speech recognition, it is well known that particular sounds can be identified by means of their frequency versus time relationship. In the frequency spectrum of spoken sound, the major vocal resonances are manifested by maximums, generally referred to as formants. It has been heretofore determined that much of the sound quality of human speech can be described by means of the formants. Thus in speech recognition, the detection of frequency maximums (formants) is decidedly useful. It is also valuable in speech systems to be able to detect local maximums while inhibiting other maximums which occur nearby the local maximum in point of time. The value of such a feature will be discussed more fully hereinbelow.

An object of the present invention is to provide an apparatus for indicating the local extreme variations of a varying input signal.

Another object of the present invention is to provide an apparatus for indicating selected local positive variations or selected local negative variations of a varying input signal.

A further object of the present invention is to provide an apparatus for indicating selected local positive or negative variations of the signal near the selected variation.

The foregoing and other objects, features, and advantages of the invention will be apparent from the following more particular description of preferred embodiments of the invention, as illustrated in the accompanying drawings.

Figure 1:
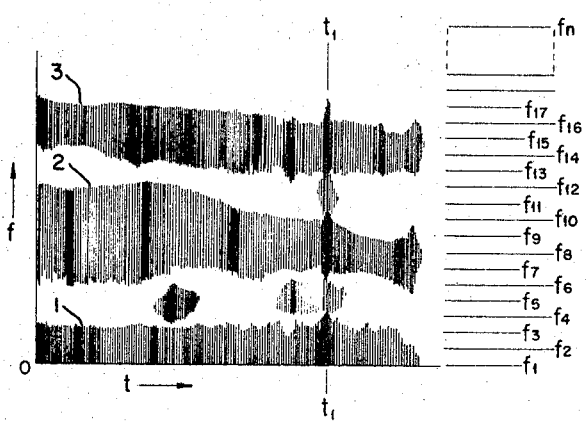
FIGS. 1 and 2 are graphical representations of specimens of spoken sound.

A method of graphically presenting a speech specimen is described in detail in a text authored by Ralph K. Potter, George A. Kopp, and Harriet C. Green entitled Visible Speech, 1947, published by the D. Van Nostrand Co., Inc., New York. FIG. 1 illustrates a typical sound spectrogram obtained by means of the Sound Spectrograph described in this text. The sound spectrograph is a plot of frequency vs. time for an electrical representation of spoken sound as obtained through a microphone. It is noted that there are distinct areas of maximum intensity 1, 2, and 3. These frequency spectrum maximums are known as the formants, and are characteristic of the spoken sound. Spectrograms of the same sounds tend to be similar in appearance, even when spoken by different persons, and regardless of whether the speakers are male or female. Vowel sounds lend themselves to identification by formants better than do consonants, however, it can be generally stated that speech can be recognized or identified by an investigation of at least the first three formants in the frequency spectrum of the speech being investigated.

As FIG. 1 illustrates, the formants occur simultaneously in time, and occupy distinct segments of the frequency domain. A known method of identifying speech through its formants employs a set of contiguous band-pass filters in parallel through which the speech signal is passed. The output of each band-pass filter is then applied to a maximum amplitude detector such that the frequency spectrum maximums are determined. The locations of the frequency spectrum maximums within the frequency domain characterizes the spoken sound at any given time.

The first requirement of a speech identification system based on formant selection would, therefore, be the inclusion of a means for detecting one or more local frequency spectrum maximums at a given time. A drawback arises, however, due to the presence of harmonics in the speech spectrum which might be mistaken for formants and thereby result in an erroneous sound identification. These harmonics occur on either side of the formants and have frequency values close to the frequency of the formants. While the harmonics are of significant amplitude, they are not equal to or greater than the formant amplitudes.

Figure 2:
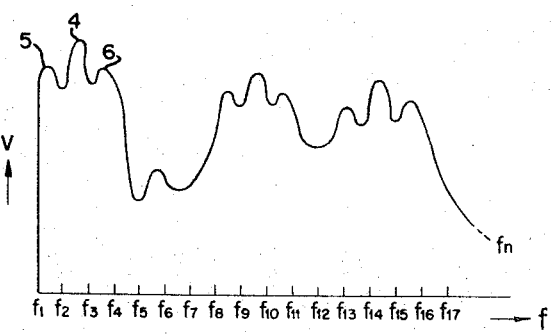

FIG. 2 illustrates the variation in power with frequency (power spectrum) of the speech signal at a given time $t_1$, that is, at time $t_1$ the intensity of the band $f_2$ to $f_3$ is greater than the intensity of band $f_1$ to $f_2$ as may be determined by the relative darkness of band $f_1$ to $f_2$ and band $f_2$ to $f_3$ at time $t_1$ in FIG. 1. The amplitudes of the curve in FIG. 2 also correspond to the degree of darkness of the bands in FIG. 1 at time $t_1$. Formant 1 is characterized by having a local maximum 4 and two harmonic maximums 5 and 6. It is desired that the maximum 4 be recognized by the selection circuit as a formant, but that maximums 5 and 6 be inhibited so as not to be present at the output of the selection circuit.

The present invention, being capable of detecting local signal maximums in addition to rejecting lesser signal amplitudes nearby in frequency to the local maximum, would be useful in speech identification systems as discussed hereinbelow.

Figure 3:
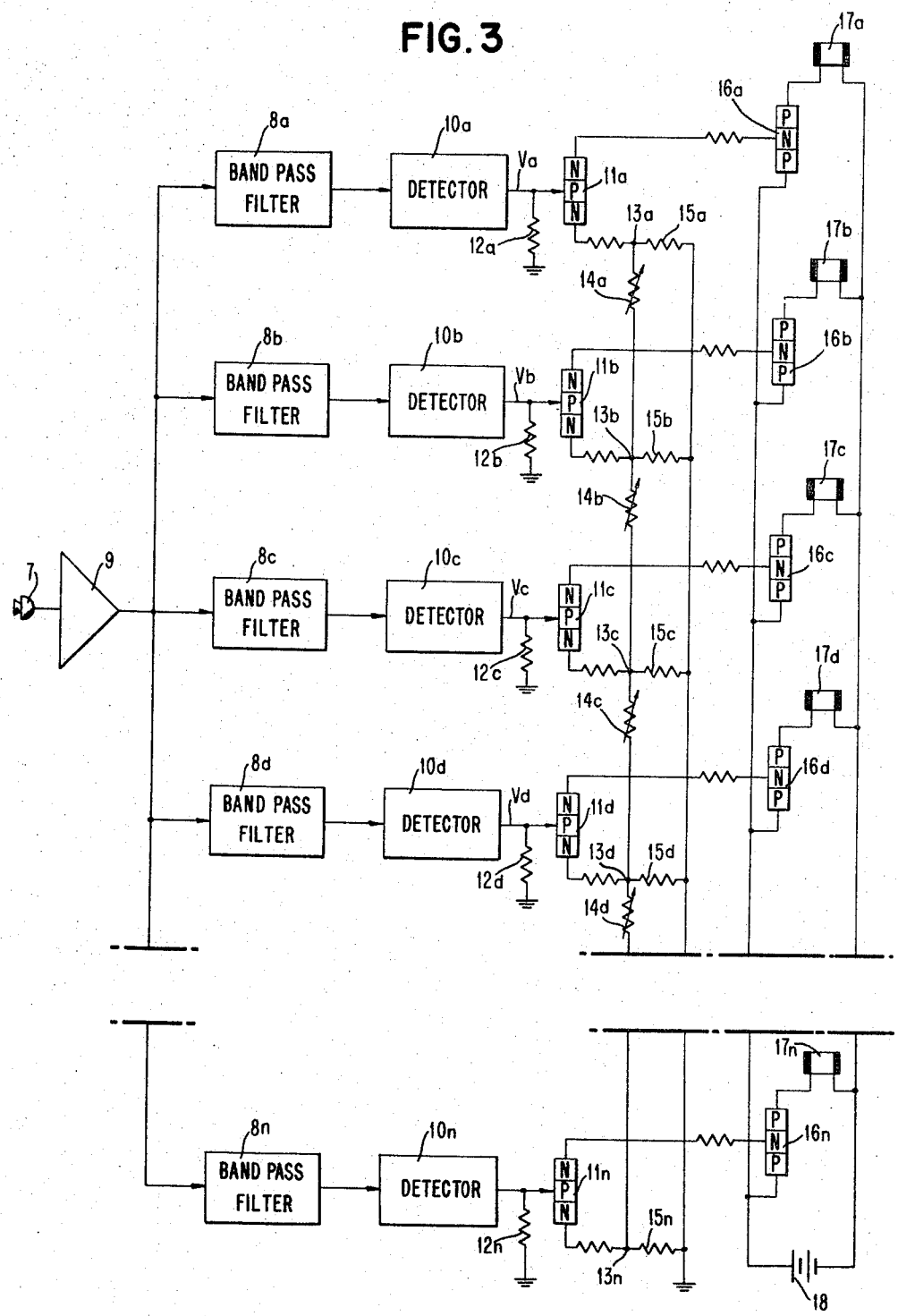
FIG. 3 is a combined block diagram and schematic drawing of a preferred embodiment of the present invention for speech identification.

Referring to FIG. 3, the present invention is shown in the preferred embodiment of an apparatus for selecting speech formants. The speech input is applied to a microphone 7 which generates a time varying electrical wave form. The output of microphone 7 is applied to a plurality of contiguous band-pass filters $8a$ through $8n$ connected in parallel through an amplifier 9. The number of filters employed will be determined by the degree of fine selection desired in the system. The output of each band-pass filter is applied to one of a plurality of square law detectors $10a$ through $10n$ which generates a positive output voltage indicative of the square of one polarity of the input signal. Since power is proportional to the square of the voltage, the output of the detectors is indicative of the power in the band of frequencies passed by each associated filter.

The output from each detector is applied to the base connections of a group of NPN transistors $11a$ through $11n$. Each transistor base circuit includes a resistor $12a$ through 12n to protect the transistor in the event of a disconnected input signal. The emitter-base connection of the transistors provide unidirectional diode action.

At any given time during the presence of the speech input signal there will be frequency spectrum maximums (formants) present in one or more of the parallel passbands defined by the filters. Assume by way of an example, that a speech specimen of the type illustrated in FIG. 1 is present at the input to microphone 7 and that the time is $t=t_1$. The microphone will convert the speech signal to an A.C. voltage having a plurality of frequency components occurring in parallel. The various frequency components will be passed by band-pass filters 8a through 8n according to their particular values. The output signals from each of the filters are applied to the detectors, the outputs of which are varying D.C. voltages proportional to the power of the frequency spectrums. A composite curve of the output voltages of the detectors is illustrated by FIG. 2. The output voltages of each of the detectors are applied to the bases of corresponding transistors.

The detector output voltages appearing at the bases of transistors 11a, 11b, and 11c, hereinafter designated Va, Vb, and Vc are graphically shown as amplitudes 4, 5, and 6 in FIG. 2. These voltages will tend to cause the transistors 11a, 11b, and 11c to conduct. When transistor 11b conducts collector to emitter current flows and the potential at point 13b increases. The increase in potential at point 13b, which is greater in magnitude than Va and Vc, also causes an increase in potential at points 13a and 13c. The potentials at points 13a and 13c, which are equal to the potential at point 13b minus the drops through resistors 14a and 14b will nevertheless, because the value of resistors 14a through 14n were so selected, be greater than Va and Vc so that transistors 11a and 11c will not conduct. In this manner, the formant represented by amplitude 5 will be detected while the harmonic amplitudes 4 and 6 will be inhibited. The voltage increase at point 13b is also felt at the other transistors 14d through 14n, however, as emitter current flows away from point 13b a further voltage drop occurs due to resistor 14c. Because of the selected value of resistors 14a through 14n, this second (and beyond) voltage drop is sufficient to reduce the potential appearing at the emitters of succeeding transistors 14d through 14n to a level which will permit the succeeding transistors to conduct if other local maximums are present thereat.

Thus, if Vd were a local amplitude representing a formant, transistor 11d would conduct. In the present example, however, transistor 11d is responsive to signals occurring in frequency band $f_5$ to $f_6$, and at $t=t_1$ this voltage is at a level well below that of a formant, thus the voltage at point 13d is sufficient to maintain transistor 11d nonconductive.

Figure 4:
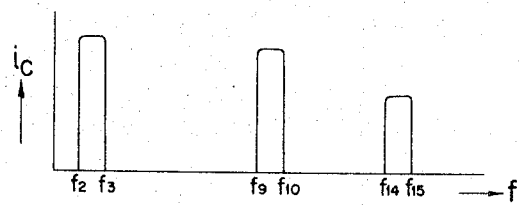
FIG. 4 is an illustration of a current vs. frequency relationship associated with the embodiment of FIG. 3.

It is seen, therefore, that the circuit shown in FIG. 3 is responsive to all local frequency maximums (formants), and inhibits the undesired harmonic amplitudes in the vicinity of the formants. The output (collector) currents of 11a through 11n resulting from a signal as shown in FIG. 2 is illustrated in FIG. 4.

The collector currents in the formant detecting transistors, for example, transistor 11b, will cause normally cut-off transistor 16b to conduct. The collector current of transistor 16b will energize relay coil 17b and thereby indicate to a suitable output device the frequency band in which the formants lie at any given time. The formant locations being determined, an evaluation of the input speech may be made. It would be possible to locate relay coils 17a through 17n directly in the collector circuit of transistors 11a through 11n and eliminate the necessity for transistors 16a through 16n, but this would seriously load down the circuit of transistors 11a through 11n, and good circuit practice would suggest the use of second stage transistors 16a through 16n. It is also to be understood that transistors 11a through 11n, being unidirectional devices, may in an alternate embodiment be replaced with diodes.

Resistors 14a through 14n are shown as adjustable to illustrate that the voltage drop between transistors can be controlled. The ratio of resistances 14a through 14n to resistances 15a through 15n determines the effect of the output of each transistor on adjacent transistors. In operation, the object is to provide a resistance which will decrease the voltage appearing in the emitter of the formant detecting transistor a given amount such that adjacent transistors will remain cut off, but further voltage drops through further resistances will decrease the voltage an amount sufficient to permit conduction of the remaining transistors. In the usual situation, there is more than one formant present in the speech signal at any given time, and therefore, more than one transistor will be responding to and detecting local maximums and inhibiting their adjacent transistors. Nevertheless, the description of operation relating to transistor 11b also holds true in the situation where more than one formant is present.

Variable resistors 14a through 14n may be selected to be of the dynamically variable type, such as thermistors. The resistance will then be a function of the current passing therethrough, and more precise signal selection would be possible.

With slight modification, the circuit shown in FIG. 3 may be used to detect local minimums rather than local maximums. In such instances, transistors 11a through 11n will be PNP type and transistors 16a through 16n will be NPN type and the polarity of source 18 will be reversed.

It is noted that the circuit shown in FIG. 3 serves to indicate local maximum amplitudes while inhibiting adjacent lower magnitude amplitudes of signals within a frequency domain. In some instances, it would be desirable to indicate not only the local maximums, but to also indicate the lesser valued amplitudes which would ordinarily be inhibited by the circuit shown in FIG. 3, while still inhibiting the harmonic peaks associated with the local maximums. For example, the circuit shown in FIG. 3 would not indicate the presence of the amplitude present in the $f_5$ to $f_6$ frequency band.

Figure 5:
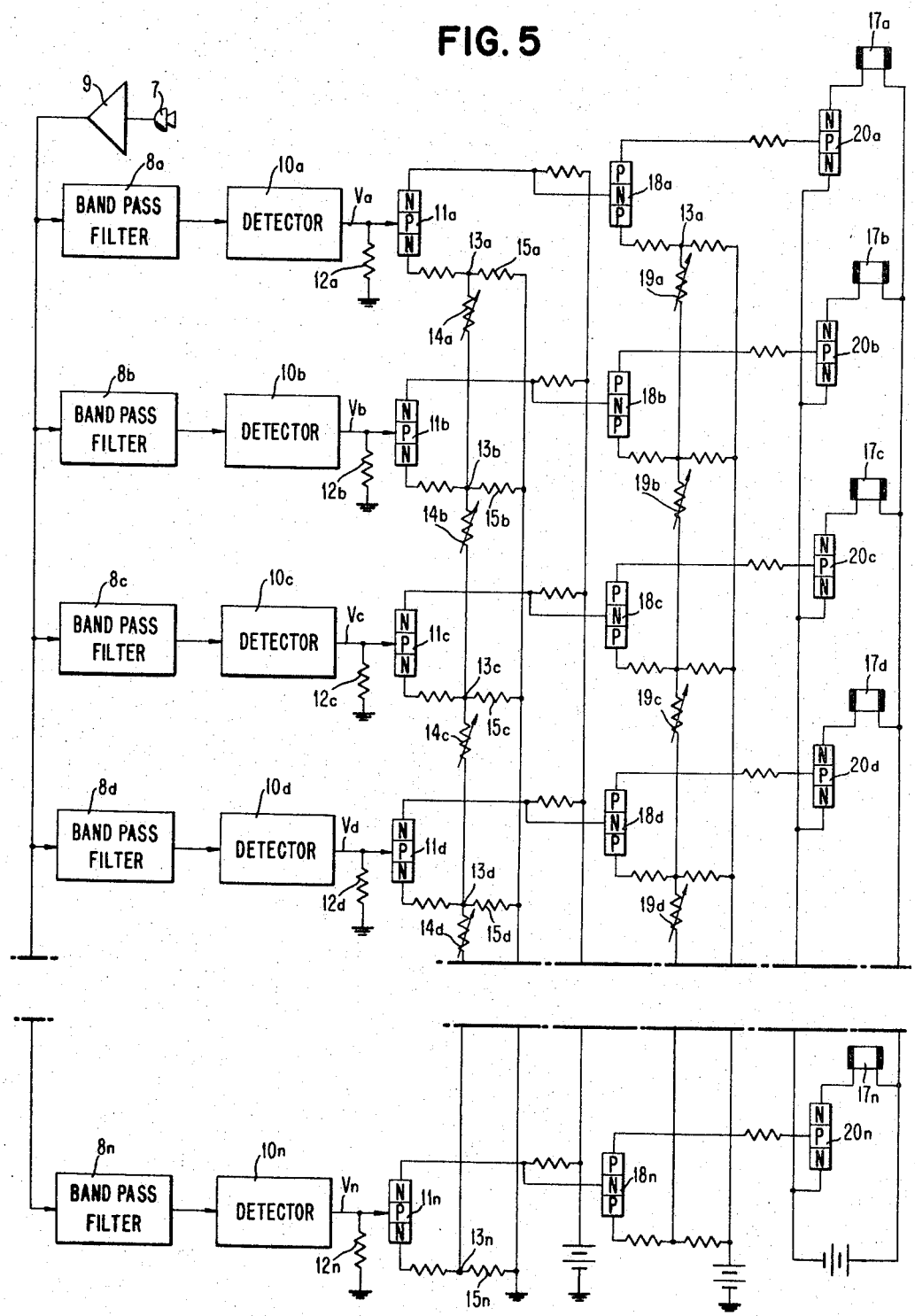
FIG. 5 is a combined block diagram and schematic drawing of another embodiment of the present invention.

Referring to FIG. 5, another embodiment of the present invention is shown wherein the local maximums are indicated and harmonics inhibited as in FIG. 3, and lesser amplitudes such as that in the $f_5$ to $f_6$ frequency band are also indicated.

Figure 6:
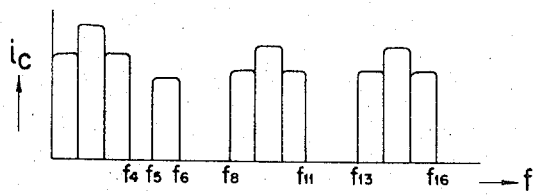
FIGS. 6 and 7 are illustrations of current vs. frequency relationships associated with the embodiment of FIG. 5.

The circuit of FIG. 5 is similar in operation to that shown in FIG. 3 with the exception that a second transistor stage is added. The circuit elements in FIG. 5 which are identical to those shown in FIG. 3 are designated by the same reference numbers. The circuit of FIG. 5 differs from that of FIG. 3 in that a plurality of PNP transistors, 18a through 18n, are coupled to the collector electrodes of transistors 11a through 11n, respectively. In this embodiment, resistors 14a through 14n are set at relatively higher values than their equivalents in the circuit of FIG. 3. In such instance, the voltages appearing at the emitter junctions of the transistors conducting in response to local maximums are greatly attenuated by resistors 14a through 14n between adjacent transistors. Thus, those ones of transistors 11a through 11n which in the circuit of FIG. 3 would have been back biased, will now conduct because the increased voltage drops through resistors 14a through 14n and lowers the voltage on their emitters. This permits lower amplitude input signals to be transmitted through the collector circuits of transistors 11a through 11n. The output current which flows in the collectors of transistors 11a through 11n as a result of input signals shown in FIG. 2 are illustrated by the curve in FIG. 6. In FIG. 6, the lesser amplitude signal in the $f_5$ to $f_6$ band which would have been inhibited by the circuit of FIG. 3 is now indicated, and is transmitted as an output along with the local maximums and their associated harmonics. The output current present on the collectors of transistors 11a through 11n as shown in FIG. 6 are applied as inputs to the bases of transistors 18a through 18n. It is also to be noted that the output signals from each of the transistors 11a through 11n tend to be more equal in amplitude than those shown in FIG. 4. This is due to the fact that a greater number of the transistors 11a through 11n are conducting and the voltages appearing at the emitters of the transistors tend to have an equalizing or smoothing effect on each other.

Figure 7:
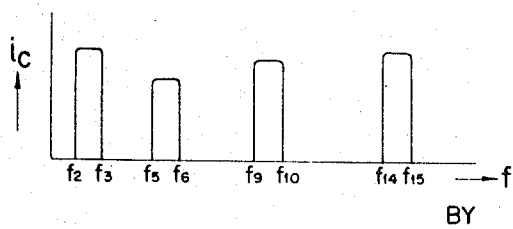

The resistors 19a through 19n in the emitter circuits of transistors 18a through 18n are lower in value than resistors 14a through 14n. The operation of transistors 18a through 18n are essentially the same as the operation of transistors 11a through 11n in FIG. 3. That is, the harmonic amplitudes occurring near local maximum amplitudes will be inhibited while the local maximum spaced further apart in frequency will be indicated and the resultant output collector current from transistors 18a through 18n appear as shown in FIG. 7. The embodiment shown in FIG. 5, therefore, may be employed when it is desired to indicate a greater number of local amplitude maximums than ordinarily indicated by the circuit of FIG. 3 and to also produce output indication signals which are independent of the relative amplitudes of the input local maximums being indicated. Thus, the embodiment of FIG. 5 also functions as a signal equalizer.

The output signals from the transistors 18a through 18n, as illustrated in FIG. 7, are applied to the bases of transistors 20a through 20n. Transistors 20a through 20n are identical in function to transistors 16a through 16n of FIG. 3 with the exception that they are shown connected as NPN in order to be compatible with PNP transistors 18a through 18n. Transistors 20a through 20n are employed to energize the relays 17a through 17n to provide amplitude maximum indications to a suitable utilization device.

It is to be understood that, following the principles of the present invention as discussed with relation to FIG. 5, additional stages of transistors can be connected in series with transistors 18a through 18n. The number of stages employed in such instances will be determined by the particular application for which the invention is to be utilized.

While the invention has been particularly shown and described with reference to preferred embodiments thereof, it will be understood by those skilled in the art that various changes in form and details may be made therein without departing from the spirit and scope of the invention.

What is claimed is:

1. An apparatus for providing an indication of local amplitude extremes within a signal comprising, in combination: a plurality of parallel signal paths coupled to a source of input signal, each signal path including means for passing a discrete frequency band of said signal from said source, a square-law detector circuit responsive to the output signal from said frequency passing means for generating a signal approximately indicative of the power therein, a transistor means responsive to said signal from said square-law detector for producing an output signal proportional to the power in said discrete frequency band, and means responsive to said proportional signal from said transistor means for producing an indication signal, said transistor means in each path being connected to the transistor means in adjacent paths by resistors such that transistor means output signals of local amplitude extremes maintain at least adjacent ones of said transistor means in their cut-off state.

2. An apparatus for providing an indication of local amplitude extremes within a signal comprising, in combination: a plurality of parallel signal paths coupled to a source of input signal, each signal path including a band-pass filter for passing a discrete frequency band of said signal from said source, a square-law detector circuit responsive to the output signal from said filter for generating a signal approximately indicative of the power therein, a transistor means responsive to said signal from said square-law detector for producing an output signal proportional to the power in said discrete frequency band, and means responsive to said proportional signal from said transistor means for producing an indication signal, said transistor means in each path being connected to the transistor means in adjacent paths by resistors such that transistor means output signals of local amplitude extremes maintain at least adjacent ones of said transistor means in their cut-off state.

3. An aparatus for providing an indication of local amplitude extremes within a signal according to claim 2 wherein said resistors are variable resistors.

4. An apparatus for providing an indication of local amplitude extremes within a signal according to claim 2 wherein said means responsive to said proportional signal from said transistor means in each path includes a second transistor means and a relay responsive to the output of said second transistor means.

5. An apparatus for providing an indication of local amplitude maximums within a signal comprising, in combination: a plurality of parallel signal paths coupled to a source of input signal, each signal path including a band-pass filter for passing a discrete frequency band of said signal from said source, a square-law detector circuit responsive to the output signal from said filter for generating a signal approximately indicative of the power therein, a transistor means responsive to said signal from said square-law detector for producing an output signal proportional to the power in said discrete frequency band, and means responsive to said proportional signal from said transistor means for producing an indication signal, said transistor means in each path being connected to the transistor means in adjacent paths by resistors such that transistor means output signals of local amplitude maximums maintain at least adjacent ones of said transistor means in their cut-off state.

6. An apparatus for providing an indication of local amplitude maximums within a signal according to claim 5 wherein said transistor means include transistors of the NPN type.

7. An apparatus for providing an indication of local amplitude minimums within a signal comprising, in combination: a plurality of parallel signal paths coupled to a source of input signal, each signal path including a band-pass filter for passing a discrete frequency band of said signal from said source, a square-law detector circuit responsive to the output signal from said filter for generating a signal approximately indicative of the power therein, a transistor means responsive to said signal from said square-law detector for producing an output signal proportional to the power in said discrete frequency band, and means responsive to said proportional signal from said transistor means for producing an indication signal, said transistor means in each path being connected to the transistor means in adjacent paths by resistors such that transistor means output signals of local amplitude minimums maintain at least adjacent ones of said transistor means in their cut-off state.

8. An apparatus for providing an indication of local amplitude minimums within a signal according to claim 7 wherein said transistor means include transistors of the PNP type.

9. An apparatus for providing an indication of formant frequencies within a speech signal comprising, in combination: means for converting said speech signal into a multiple frequency signal of varying amplitude, a plurality of contiguous band-pass filters coupled to said converting means for passing separate frequency bands of said multiple frequency signal, a square-law detector coupled to each of said filters for generating a signal approximately indicative of the power contained in each of said separate frequency bands, a transistor means coupled to each of said detectors and responsive to said signal therefrom for producing an output signal proportional to the power in each of said frequency bands, a resistor coupled between each of said transistor means, said resistors providing signal paths for said transistor means output signals such that the transistor means associated with the frequency bands containing formant frequencies will maintain in cutoff states at least the transistor means adjacent thereto, and means coupled to each of said transistor means responsive to the conducting transistor means to provide an output signal indicating the presence of a formant frequency.

10. An apparatus for providing an indication of local amplitude extremes within a signal comprising, in combination: a plurality of contiguous band-pass filters coupled to a source of multiple frequency input signal for passing separate frequency bands of said input signal, a square-law detector coupled to each of said filters for generating a signal approximately indicative of the power contained in each of said separate frequency bands, a first plurality of transistor means each one coupled to a separate one of said detectors and responsive to said signal therefrom for producing an output signal proportional to the power in each of said frequency bands, a first plurality of resistors each one coupled between separate ones of said transistor means, said first resistors providing signal paths for said transistors means output signals such that the transistor means associated with the frequency bands of relatively higher amplitude will maintain in cut-off states given ones of the transistor means associated from frequency bands of relatively lower amplitudes, a second plurality of transistor means, each one coupled to a separate one of said first transistor means and responsive to the signals from the conducting one of said first transistor means for producing an output signal proportional thereto, a second plurality of resistors, each one coupled between separate ones of said second transistor means, said second transistor means providing signal paths for said second transistor means output signals such that said second transistor means responsive to relatively higher amplitude signals will maintain in cut-off states the ones of said second transistor means adjacent thereto, and means coupled to each of said second transistor means responsive to the signals from the conducting ones thereof for producing an indication signal.

References Cited by the Examiner

UNITED STATES PATENTS

| | | | |
|---|---|---|---|
| 2,680,228 | 6/54 | Smith | 324—77 |
| 2,851,661 | 9/58 | Buland | 179—1 |
| 2,891,111 | 6/59 | Flanagan | 179—1 |
| 2,892,892 | 6/95 | Rack | 179—15.55 |
| 2,911,476 | 11/59 | Kramer et al. | 178—15.55 |

OTHER REFERENCES

"Design and Study of Correlation Instrumentation for Speech Analysis and Synthesis," by J. B. McEvoy et al., pages 29, 32, and 33.

ROBERT H. ROSE, *Primary Examiner.*